(12) United States Patent
Thiel

(10) Patent No.: US 8,622,043 B1
(45) Date of Patent: Jan. 7, 2014

(54) ELECTRICAL POWER GENERATION SYSTEM THAT INCLUDES A FLUID CONTAINMENT SYSTEM

(75) Inventor: John R. Thiel, Sheboygan, WI (US)

(73) Assignee: Kohler Co., Kohler, WI (US)

( * ) Notice: Subject to any disclaimer, the term of this patent is extended or adjusted under 35 U.S.C. 154(b) by 0 days.

(21) Appl. No.: 13/546,049

(22) Filed: Jul. 11, 2012

(51) Int. Cl.
*F02B 77/08* (2006.01)
(52) U.S. Cl.
USPC ............. 123/198 D; 123/2; 123/198 DA; 123/41.15
(58) Field of Classification Search
USPC ............ 123/2, 41.14, 41.15, 198 D, 198 DA; 290/1 B, 1 R; 180/69.1
See application file for complete search history.

(56) References Cited

U.S. PATENT DOCUMENTS

| | | | |
|---|---|---|---|
| 4,458,634 A | 7/1984 | Carr et al. | |
| 6,601,542 B2 | 8/2003 | Campion | |
| 6,945,207 B2* | 9/2005 | Biess et al. | 123/142.5 R |
| 7,040,454 B2 | 5/2006 | Kawamoto et al. | |
| 7,089,889 B2 | 8/2006 | Johnson et al. | |
| 7,717,093 B2 | 5/2010 | Yamamoto et al. | |
| 7,739,997 B2 | 6/2010 | Leisner | |
| 7,930,882 B2 | 4/2011 | Yuri | |
| 7,976,700 B2 | 7/2011 | Arakawa et al. | |
| 8,051,953 B2 | 11/2011 | Antalek et al. | |
| 8,220,482 B1* | 7/2012 | DeVerse et al. | 137/412 |
| 2003/0159595 A1* | 8/2003 | Kiefer et al. | 99/468 |
| 2005/0139286 A1* | 6/2005 | Poulter et al. | 141/234 |
| 2007/0063856 A1* | 3/2007 | Gibson | 340/608 |
| 2008/0127912 A1* | 6/2008 | Onodera et al. | 123/2 |
| 2012/0275927 A1* | 11/2012 | Rhim | 417/36 |

* cited by examiner

*Primary Examiner* — Hung Q Nguyen
(74) *Attorney, Agent, or Firm* — Schwegman Lundberg & Woessner, P.A.

(57) ABSTRACT

Some embodiments relate to an example electrical power generation system that includes a fluid containment system (FIG. 2 shows the example electrical power generation system of FIG. 1 where the fluid containment system is filled with fluid F). The electrical power generation system includes an internal combustion engine and an alternator that is driven by the internal combustion engine to generate electrical power. The electrical power generation system further includes an enclosure such that the internal combustion engine and alternator are positioned within the enclosure. The fluid containment system is positioned below the internal combustion engine and the alternator to collect fluids F. The fluid containment system includes a drain. The electrical power generation system further includes a control that selectively operates the drain to permit fluids F to exit the fluid containment system.

21 Claims, 4 Drawing Sheets

ELECTRICAL POWER GENERATION SYSTEM THAT INCLUDES A FLUID CONTAINMENT SYSTEM

TECHNICAL FIELD

Embodiments pertain to an electrical power generation system, and more particularly to an electrical power generation system that includes a fluid containment system.

BACKGROUND

Existing electrical power generation systems typically include engine driven generators that require a variety of different fluids in order to operate properly. As an example, the engine requires oil (and other lubricating fluids) in order to function for any extending period of time.

In addition, a fan and radiator combination is usually required in order to cool the engine so that the engine can operate for extended periods of time. The radiator requires a coolant in order function properly.

The fluids in such systems can inadvertently (and undesirably) leak into a fluid containment system that is located below the engine driven generator. These fluid containment systems are usually required in order to meet local codes and/or satisfy customer requirements.

Existing electrical power generation systems that include engine driven generators are typically located inside of an enclosure. One of the drawbacks with placing electrical power generation systems inside an enclosure is that water can often times undesirably get inside the enclosure (e.g., through rain, snow condensation, power washing, etc.).

This water collects inside the fluid containment system. When water collects in such fluid containment systems, the water needs to be removed.

Therefore, a need exists for an electrical power generation system that includes an engine driven generator where a fluid containment system that is located below the engine driven generator and selectively drains fluid from the fluid containment. The electrical power generation system should be able to drain the fluid from the fluid containment system in a preferred manner based on the type and amount of fluid in the fluid containment system.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
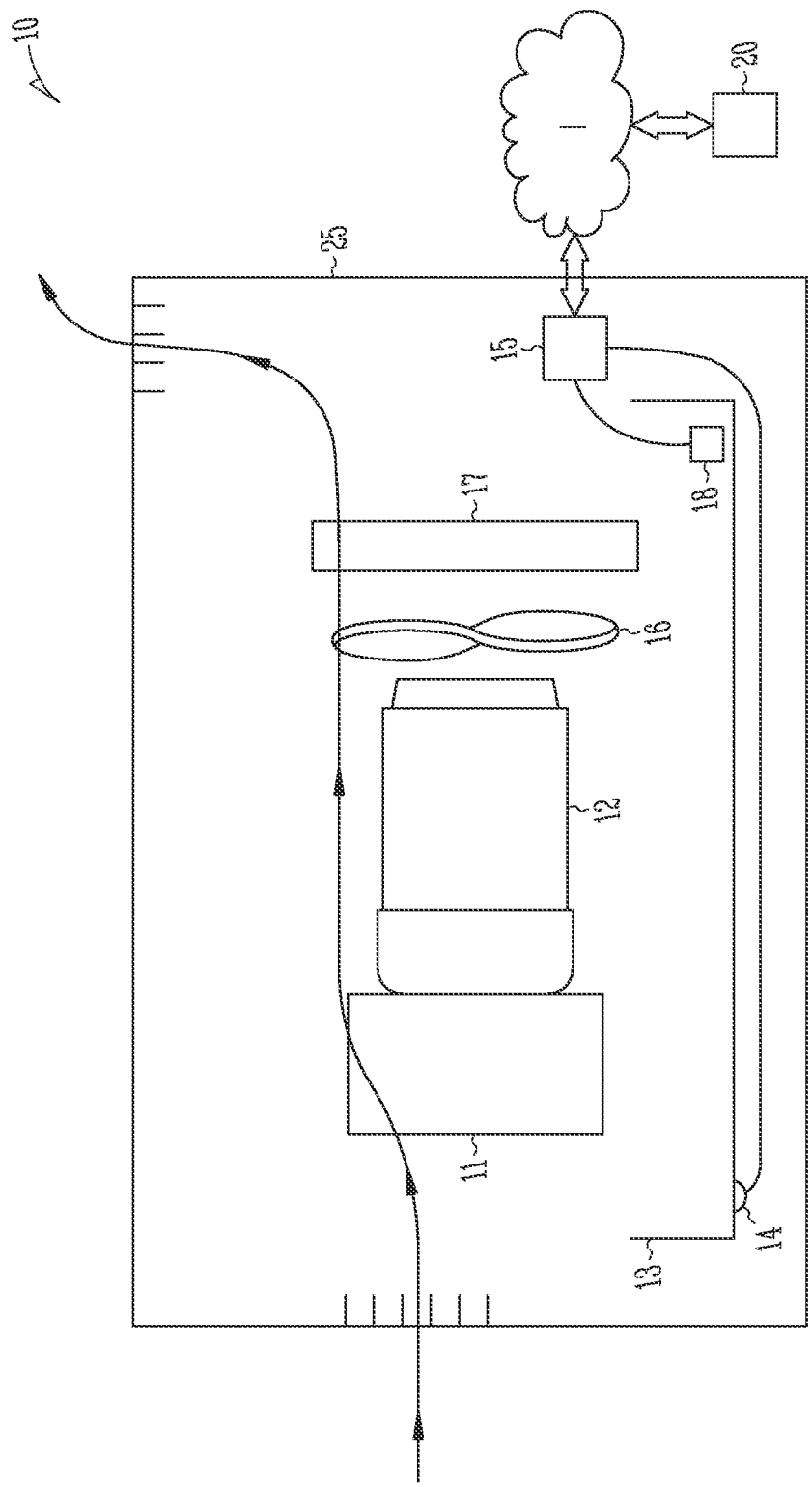
FIG. 1 is a schematic view illustrating an example electrical power generation system that includes a fluid containment system.
Figure 2:
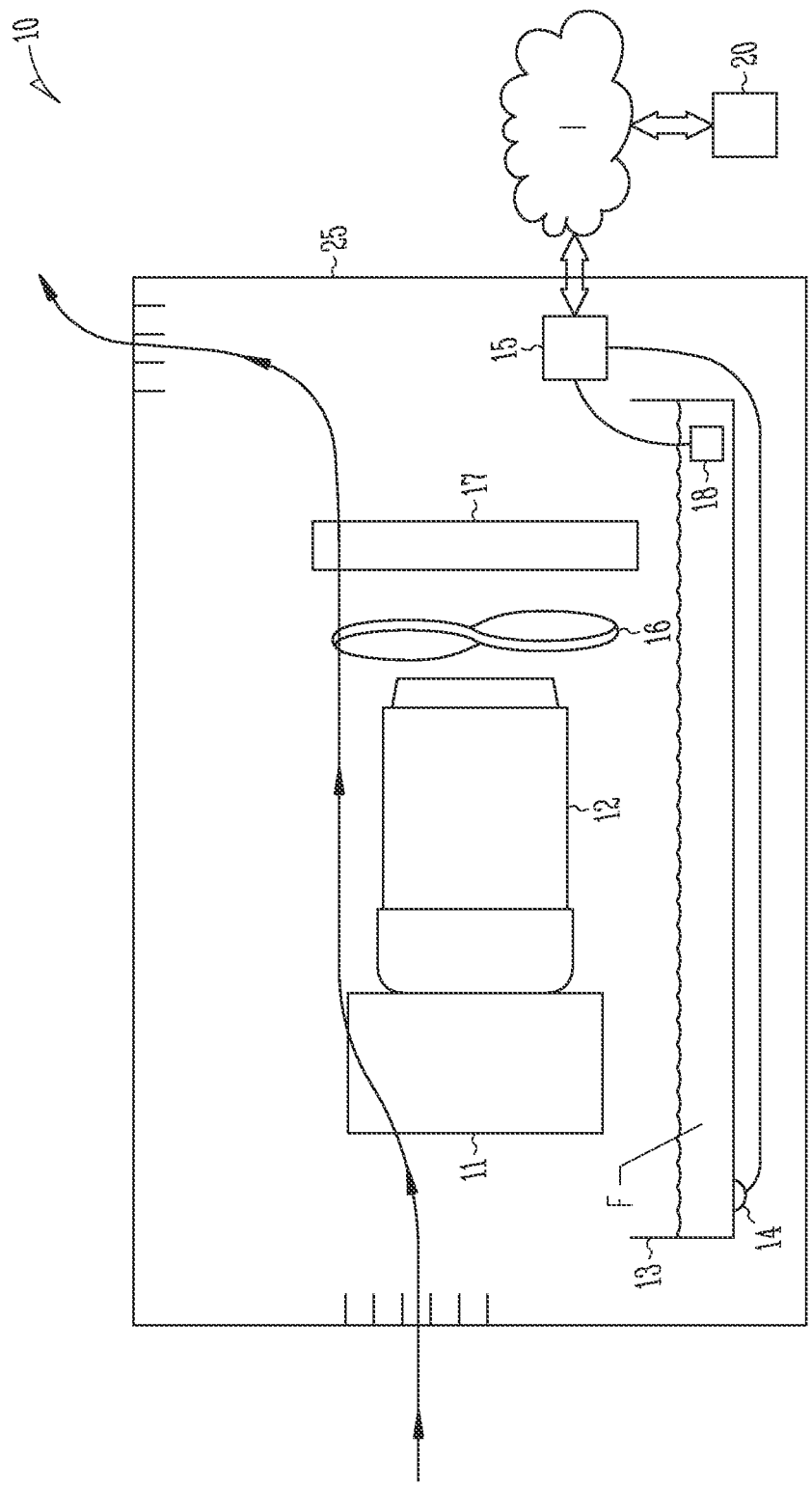
FIG. 2 is a schematic view illustrating the example electrical power generation system of FIG. 1 where the fluid containment system is filled with fluid.

FIG. 1 is a schematic view illustrating an example electrical power generation system 10 that includes a fluid containment system 13 (FIG. 2 shows the example electrical power generation system 10 of FIG. 1 where the fluid containment system 13 is filled with fluid F). The electrical power generation system 10 includes an internal combustion engine 12 and an alternator 11 that is driven by the internal combustion engine 12 to generate electrical power.

The electrical power generation system 10 further includes an enclosure 25 such that the internal combustion engine 12 and alternator 11 are positioned within the enclosure 25. The fluid containment system 13 is positioned below the internal combustion engine 12 and the alternator to collect fluids F.

The fluid containment system 13 includes a drain 14. The electrical power generation system 10 further includes a control 15 that selectively operates the drain 14 to permit fluids F to exit the fluid containment system 13.

In some embodiments, the control 15 may be part of a generator controller that serves to operate the type and amount of power that is produced by the engine 12 and alternator 11 combination. It should be noted that the control 15 may serve to operate other parts of the electrical power generation system 10. In addition, the control 15 may serve as a stand-alone device that only opens and closes the drain 14.

In the illustrated example embodiments, the control 15 is inside the enclosure 25. It should be noted that in other embodiments, the control 15 may be outside the enclosure 25.

In some embodiments, the fluid containment system 13 is a basin. Embodiments are also contemplated where the fluid containment system 13 is a bucket, container, enclosed tank or any other device that is capable of storing fluid. The type of fluid containment system 13 that is included in the electrical power generation system 10 will depend in part on (i) the location of the electrical power generation system 10; (ii) the type and amount of fluids that are to be collected by the fluid containment system 13; and/or (iii) the overall design of electrical power generation system 10 (among other factors).

Figure 3:
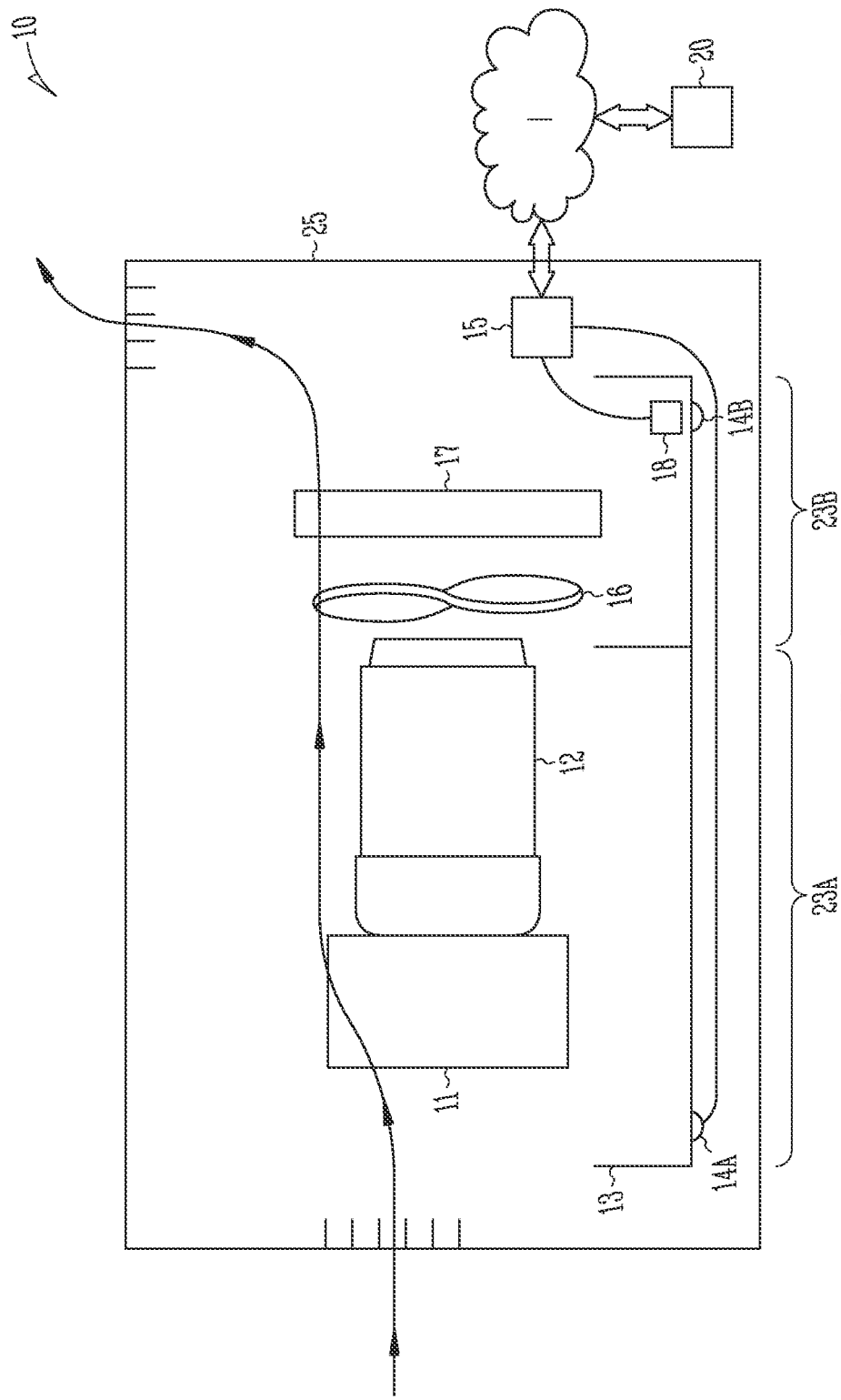
FIG. 3 is a schematic view illustrating another example electrical power generation system that includes a fluid containment system.

The electrical power generation system 10 may further include a fan 16 and an engine cooling system 17 (e.g., a radiator) positioned near the engine 12 to cool the internal combustion engine 12. FIG. 3 shows an example embodiment where the fluid containment system 13 includes separate sections 23A, 23B such one of the sections 23A is below the internal combustion engine 12 and another of the sections 23B is below the engine cooling system 17.

In the example embodiment shown in FIG. 3, each of the sections 23A, 23B of the fluid containment system 13 includes a respective drain 14A, 14B that is connected to the control 15 such that the control 15 selectively operates each of the drains 14A, 14B. As an example, the control 15 may selectively open drain 14A to drain leaked engine fluid from section 23A of the fluid containment system 13. In addition, the control 15 may selectively open drain 14B to drain leaked coolant from section 23B of the fluid containment system 13.

The electrical power generation system 10 may further include a sensor 18 (shown in FIGS. 1-4) that is connected to the control 15. The sensor 18 determines the presence of fluid F within the fluid containment system 13.

In some embodiments, the sensor 18 may determine the type and/or amount of fluid F within the fluid containment system 13. As an example, the control 15 may determine that the fluid F in the fluid containment system 13 is water. It should be noted that embodiments are contemplated where the control 15 (i) opens the drain 14 to allow the water to exit the enclosure 25; or (ii) holds the water inside the fluid containment system 13.

Figure 4:
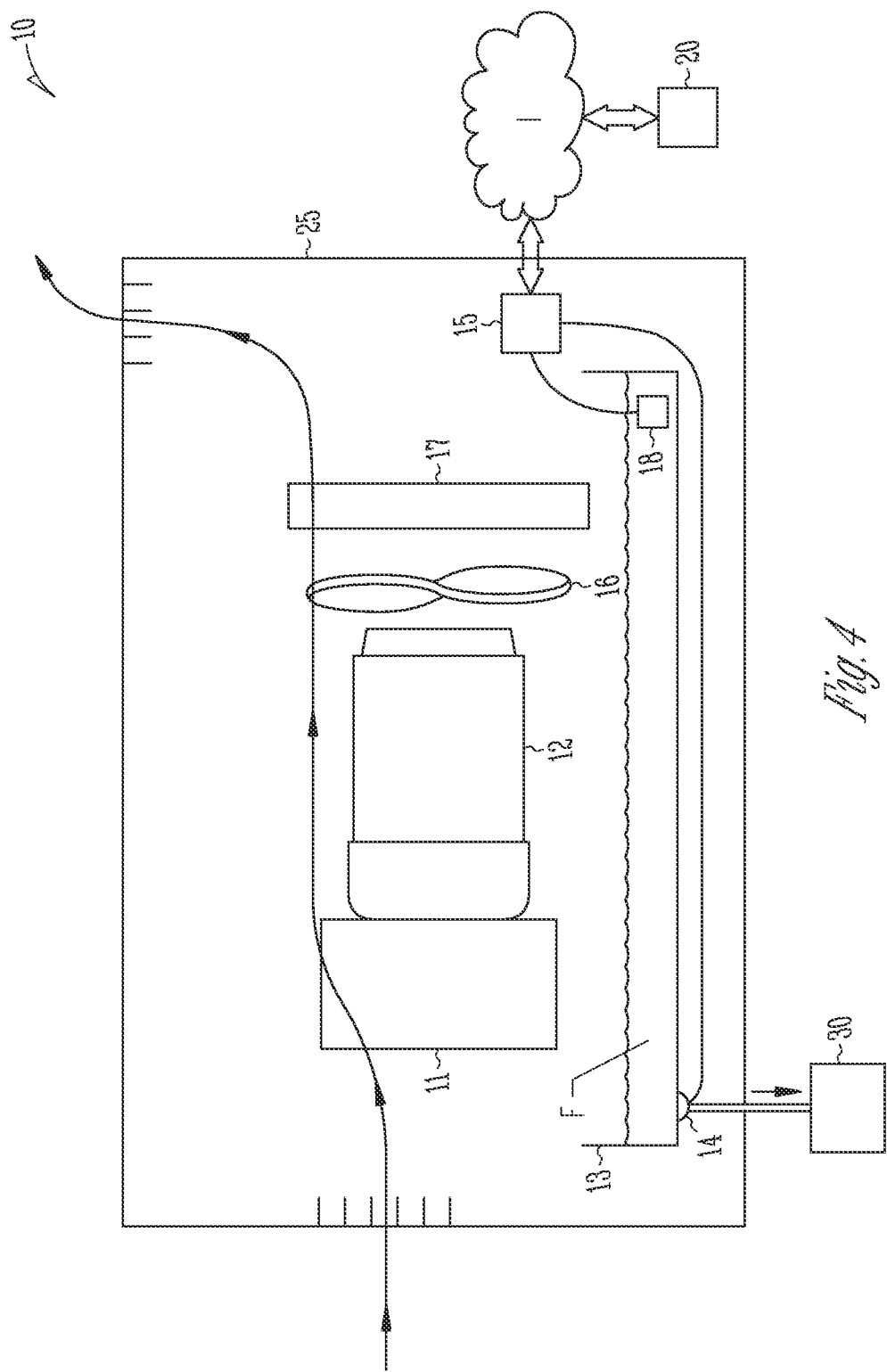
FIG. 4 is a schematic view illustrating an example electrical power generation system that includes a fluid containment system.

FIG. 4 shows an alternative embodiment where the control 15 opens the drain 14 to allow the water to be placed into a storage tank 30. It should be noted that the storage tank 30 may be placed inside or outside (as shown in FIG. 4) the enclosure 25.

As another example, the control 15 may determine that the fluid F in the fluid containment system 13 is not water (e.g., engine fluid or coolant). It should be noted that embodiments are contemplated where the control 15 (i) holds the fluid F inside the fluid containment system 13; or (ii) allows the fluid F to be placed into a storage tank 30 (see, e.g., FIG. 4).

In embodiments where the fluid containment system 13 includes multiple sections (see, e.g., FIG. 3), the control 15 may individually (or collectively) dump both sections 23A, 23B to a single storage tank or different storage tanks. The decision made by the control 15 to individually (or collectively) dump both sections 23A, 23B of the fluid containment system 13 to a single storage tank 30 or different storage tanks will depend in part on the type and amount of fluid F that is contained within each of the sections 23A, 23B (among other factors).

In the illustrated example embodiments, the control 15 may provide notification to a user 20 that fluid F is (or is not) within the fluid containment system 13. As an example, the control 15 may provide notification to a user 20 as to the amount and type of fluid F that is within the fluid containment system 13 over the Internet I.

In some embodiments, the control 15 may receive commands from the user 20 as to whether to open the drain 14 (or drains 14A, 14B in the case of the embodiment shown in FIG. 3) depending on the type (and/or amount) of fluid F that is within the fluid containment system 13. The decision as to which/when to open the drain(s) will depend in part on (i) where the electrical power generation system 10 is located; (ii) the type of enclosure 25; (iii) the capacity of fluid containment system 13; and/or (iv) the availability of storage tanks (among many other factors).

The electrical power generation systems 10 described herein may be able to differentiate the amount and types of fluid that get captured by the fluid containment system. The electrical power generation systems 10 may also control the manner in which the fluids are removed from the fluid containment system.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An electrical power generation system comprising:
   an internal combustion engine;
   an alternator driven by the internal combustion engine to generate electrical power;
   an enclosure such that the internal combustion engine and alternator are positioned within the enclosure;
   a fluid containment system positioned below the internal combustion engine and the alternator to collect fluids, wherein the fluid containment system includes a drain; and
   a controller that selectively operates the drain to permit said fluids to exit the fluid containment system depending upon a type of said fluids within the fluid containment system.

2. The electrical power generation system of claim 1, wherein the controller is a generator controller.

3. The electrical power generation system of claim 1, wherein the controller is inside the enclosure.

4. The electrical power generation system of claim 1, further comprising:
   a fan; and
   an engine cooling system positioned near the engine to cool the internal combustion engine.

5. The electrical power generation system of claim 4, wherein the fluid containment system includes separate sections such one of the sections is below the internal combustion engine and another of the sections is below the engine cooling system, wherein each of the sections of the fluid containment system includes a drain that is connected to the controller such that the controller selectively operates each of the drains.

6. The electrical power generation system of claim 1, wherein the fluid containment system is a basin.

7. The electrical power generation system of claim 1, wherein the fluid containment system collects water that enters the enclosure.

8. The electrical power generation system of claim 1, further comprising a sensor connected to the controller, wherein the sensor determines the presence of said fluids within the fluid containment system.

9. The electrical power generation system of claim 8, wherein the sensor determines the type of said fluids within the fluid containment system.

10. The electrical power generation system of claim 9, wherein the controller determines that the type of said fluids in the fluid containment system is water.

11. The electrical power generation system of claim 10, wherein the controller opens the drain to allow the water to exit the enclosure.

12. The electrical power generation system of claim 10, wherein the controller opens the drain to allow the water to be placed into a storage tank.

13. The electrical power generation system of claim 10, wherein the controller holds the water within the fluid containment system.

14. The electrical power generation system of claim 9, wherein the controller determines that the type of said fluids in the fluid containment system is not water.

15. The electrical power generation system of claim 14, wherein the controller opens the drain to allow the water to be placed into a storage tank.

16. The electrical power generation system of claim 14, wherein the controller holds the fluid that is not water within the fluid containment system.

17. The electrical power generation system of claim 1, wherein the controller provides notification to a user that said fluids are within the fluid containment system.

18. The electrical power generation system of claim 17, wherein the controller provides said notification to said user that said fluids are within the fluid containment system over the Internet.

19. The electrical power generation system of claim 17, wherein the controller receives commands from said user as to whether to open the drain depending on the type of said fluids that are within the fluid containment system.

20. The electrical power generation system of claim 17, wherein the controller receives commands from said user as to whether to open the drain depending on an amount of said fluids that is within the fluid containment system.

21. An electrical power generation system comprising:
an internal combustion engine;
an alternator driven by the internal combustion engine to generate electrical power;
an enclosure such that the internal combustion engine and alternator are positioned within the enclosure;
a fluid containment system positioned below the internal combustion engine and the alternator to collect fluids, wherein the fluid containment system includes a drain; and
a generator controller that selectively operates the drain to permit said fluids to exit the fluid containment system.

* * * * *